(12) United States Patent
Martha et al.

(10) Patent No.: US 9,843,643 B2
(45) Date of Patent: Dec. 12, 2017

(54) SYSTEM, METHOD, AND NON-TRANSITORY COMPUTER-READABLE STORAGE MEDIA FOR MONITORING CONSUMER ACTIVITY ON WEBSITES

(71) Applicant: Wal-Mart Stores, Inc., Bentonville, AR (US)

(72) Inventors: Venkata Swamy Martha, Sunnyvale, CA (US); Abhishek Gattani, Sunnyvale, CA (US)

(73) Assignee: WAL-MART STORES, INC., Bentonville, AR (US)

(*) Notice: Subject to any disclaimer, the term of this patent is extended or adjusted under 35 U.S.C. 154(b) by 337 days.

(21) Appl. No.: 14/599,945

(22) Filed: Jan. 19, 2015

(65) Prior Publication Data

US 2016/0212231 A1    Jul. 21, 2016

(51) Int. Cl.
*G06F 15/173* (2006.01)
*H04L 29/08* (2006.01)
*G06Q 30/02* (2012.01)

(52) U.S. Cl.
CPC ............ *H04L 67/22* (2013.01); *G06Q 30/02* (2013.01)

(58) Field of Classification Search
CPC ................................ H04L 67/22; G06Q 30/02
USPC ......................................................... 709/224
See application file for complete search history.

(56) References Cited

U.S. PATENT DOCUMENTS

| | | | | |
|---|---|---|---|---|
| 6,959,319 B1* | 10/2005 | Huang | ............... | G06F 17/30867 705/14.73 |
| 9,106,607 B1* | 8/2015 | Lepeska | ............... | H04L 67/2847 |
| 2009/0172551 A1* | 7/2009 | Kane | ................... | G06Q 30/02 715/733 |
| 2013/0198030 A1* | 8/2013 | Linden | ................ | G06Q 30/02 705/26.7 |
| 2014/0189519 A1* | 7/2014 | Powell | ................ | H04L 67/22 715/736 |

* cited by examiner

*Primary Examiner* — SM Rahman
(74) *Attorney, Agent, or Firm* — Bryan Cave LLP

(57) ABSTRACT

A system for monitoring consumer activity on a website is described herein. The system includes a memory device and an activity sessionization server. The memory device is configured to store a webpage list including a plurality of webpage records and an activity session list including a plurality of activity session records. Each of the activity session records including a webpage URL and a session ID. The activity sessionization server retrieves a webpage record from the webpage list, determines if the retrieved webpage record includes a referral URL, identifies a matching activity session record that includes a corresponding webpage URL that matches the referral URL of the retrieved webpage record, determines a corresponding session ID associated with the matching activity session record, and associates the corresponding session ID with the current activity session record.

18 Claims, 10 Drawing Sheets

Webpage List 30

| Browser ID | Timestamp ID | Webpage ID | Referral ID | Page Type | Page Data | Outgoing Links | Incoming Links |
|---|---|---|---|---|---|---|---|
| 00:21:01 | 2005-10-30T10:45 | walmart.com | N/A | Home Page | Product Data | /Search /Prod1 /Prod2 | /Add1 /Add2 |
| 00:21:01 | 2005-10-30T10:50 | walmart.com/Search | walmart.com | Search Page | Search Data | /Prod1 /Prod2 | /Home /ProdCat |
| 00:21:01 | 2005-10-30T11:23 | walmart.com/Product1 | walmart.com | Product 1 Page | Product 1 Data | /Search /Order1 | /Search /Order1 |
| 00:36:02 | 2005-10-30T11:30 | walmart.com/Search | walmart.com | Search Page | Search Data | /Prod1 /Prod2 | /Home /ProdCat |
| 00:36:02 | 2005-10-30T11:33 | walmart.com/ProdCat | walmart.com/Search | Product 1 Order Page | Product 1 Order Data | /Prod1 /Prod2 | /Home /ProdCat |
| 00:36:02 | 2005-10-30T11:45 | walmart.com/Order1 | walmart.com/ProdCat | Product 1 Order Page | Product 1 Order Data | /Search /Prod1 | /Prod1 |
| 00:36:02 | 2005-10-30T11:50 | walmart.com/Search | walmart.com/Order1 | Search Page | Search Data | /Prod1 /Prod2 | /Home /Prod1 /ProdCat |

FIG. 10

Activity Session List ⟋ 34

| Activity Session ID | Browser ID | Timestamp | Webpage ID | Referral ID | Page Type | Page Data | Outgoing Links | Incoming Links |
|---|---|---|---|---|---|---|---|---|
| 1 | 00:21:01 | 2005-10-30 T 10:45 | walmart.com | N/A | Home Page | Product Data | /Search /Prod1 /Prod2 | /Ad1 /Ad2 |
| 1 | 00:21:01 | 2005-10-30 T 10:50 | walmart.com/Search | walmart.com | Search Page | Search Data | /Prod1 /Prod2 | /Home /Prod1 /ProdCat |
| 1 | 00:21:01 | 2005-10-30 T 11:23 | walmart.com/Product1 | walmart.com/Search | Product 1 Page | Product 1 Data | /Search /Order1 | /Search /Order1 |
| 2 | 00:21:01 | 2005-10-30 T 11:30 | walmart.com/Search | walmart.com | Search Page | Search Data | /Prod1 /Prod2 | /Home /Prod1 /ProdCat |
| 2 | 00:21:01 | 2005-10-30 T 11:33 | walmart.com/ProdCat | walmart.com/Search | Product Category Page | Product Data | /Search /Order2 | /Search /Prod1 /Order1 |
| 2 | 00:21:01 | 2005-10-30 T 11:45 | walmart.com/Order1 | walmart.com/ProdCat | Product 1 Order Page | Product 1 Order Data | /Search /Prod1 | /Prod1 |
| 3 | 00:21:01 | 2005-10-30 T 11:50 | walmart.com/Search | walmart.com/Order1 | Search Page | Search Data | /Prod1 /Prod2 | /Home /Prod1 /ProdCat |

FIG. 11

Conversion Report — 38

| Webpage | No. Views | No. of Conversions | Conversion Rate |
|---|---|---|---|
| walmart.com/Product1 | 5 | 1 | 20% |
| walmart.com/ProdReviews | 6 | 4 | 67% |
| walmart.com/ProdCat | 3 | 1 | 30% |

FIG. 12

Resilience Report — 40

| Webpage | No. Views w/out Conversion | No. Views w/ Conversion | Resilience Rate |
|---|---|---|---|
| walmart.com/Product1 | 10 | 2 | 83% |
| walmart.com/ProdReviews | 5 | 2 | 71% |
| walmart.com/ProdCat | 1 | 3 | 25% |

FIG. 13

SYSTEM, METHOD, AND NON-TRANSITORY COMPUTER-READABLE STORAGE MEDIA FOR MONITORING CONSUMER ACTIVITY ON WEBSITES

FIELD OF THE DISCLOSURE

The present invention relates to monitoring consumer activity on websites, and more particularly, to systems, methods, and computer-readable storage media that generates activity session records indicative of web pages accessed by the consumer via web sites.

BACKGROUND

Many customers desire to order items or goods remotely, e.g., on-line, through the Internet, or using a specially designed application or app on a personal computer or mobile device, such as a tablet or cell phone. At least some known web hosting systems monitor consumer website activity by generating web log records associated with the web pages being viewed by the consumer. Consumer web logs from a website may be generated in raw text format with each browser session being uniquely identified by a cookie session identifier. Despite the web logs being collected by powerful servers, often the servers miss some user activities because of network disruptions. Such missing activities result in disconnections in user activity on the website. In addition, users may access websites using web browsers that extensively leverage multi-tab features in modern browsers. With multi-tab browsers, consumers are able to access several web pages of a website with one browser session identifier and allow a consumer to simultaneously view several web pages of a website.

Known webhosting systems generate web logs in sequential order. Thus, analyzing consumer activity analysis based on session identifier becomes challenging, and identifying the sequence of web pages viewed prior to the consumer ordering a product becomes unreliable. Moreover, the activity logs on such multi-tabbed browsers make the sessionization process by session's (cookie) unique identifier inaccurate.

The present invention is aimed at one or more of the problems identified above.

SUMMARY OF THE INVENTION

In different embodiments of the present invention, systems, methods, and computer-readable storage media allow users to monitor consumer activity on a website by generating, storing, and displaying activity records associated with the web pages being accessed by consumers.

In one embodiment, a system for monitoring consumer activity on a website is provided. The system includes a memory device and an activity sessionization server. The memory device is configured to store a webpage list and an activity session list. The webpage list includes a plurality of webpage records associated with the website that includes a plurality of web pages. Each webpage record includes at least one of a webpage uniform resource locator (URL) indicative of the associated web page and a referral URL indicative of a previously viewed web page. The activity session list includes a plurality of activity session records. Each of the activity session records includes a webpage URL and a session ID. The activity sessionization server includes a processor that is programmed to receive a request from a user computing device to display the activity session list and retrieve a webpage record from the webpage list in response to the received request. The processor also determines if the retrieved webpage record includes a referral URL and responsively identifies a matching activity session record that includes a corresponding webpage URL that matches the referral URL of the retrieved webpage record. The processor determines a corresponding session ID associated with the matching activity session record, associates the corresponding session ID with the current activity session record, generates and stores the current activity session record in the activity session list, and sends the activity session list to the user computer device for display.

In another embodiment a method for monitoring consumer activity on a website is provided. The method includes the steps of generating and storing a webpage list in a memory device. The webpage list includes a plurality of webpage records associated with the website including a plurality of web pages. Each webpage record includes at least one of a webpage URL indicative of the associated web page and a referral URL indicative of a previously viewed web page. The method includes generating and storing an activity session list in the memory device. The activity session list includes a plurality of activity session records, each of the activity session records including a webpage URL and a session ID. The method further includes receiving a request from a user computing device to display the activity session list, retrieving, by an activity sessionization server, a webpage record from the webpage list, determining if the retrieved webpage record includes a referral URL, and responsively identifying a matching activity session record that includes a corresponding webpage URL that matches the referral URL of the retrieved webpage record. The method further includes determining a corresponding session ID associated with the matching activity session record, associating the corresponding session ID with the current activity session record, generating and storing the current activity session record in the activity session list, and sending the activity session list to the user computer device for display.

In yet another embodiment, one or more non-transitory computer-readable storage media, having computer-executable instructions embodied thereon are provided. When executed by at least one processor, the computer-executable instructions cause the processor to generate and store a webpage list and an activity session list in a memory device. The webpage list includes a plurality of webpage records associated with the website that includes a plurality of web pages. Each webpage record includes at least one of a webpage URL indicative of the associated web page and a referral URL indicative of a previously viewed web page. The activity session list includes a plurality of activity session records, each of the activity session records including a webpage URL and a session ID. The processor receives a request from a user computing device to display the activity session list, retrieves a webpage record from the webpage list, determines if the retrieved webpage record includes a referral URL and responsively identifies a matching activity session record that includes a corresponding webpage URL that matches the referral URL of the retrieved webpage record. The processor determines a corresponding session ID associated with the matching activity session record, associates the corresponding session ID with the current activity session record, generates and stores the current activity session record in the activity session list; and sends the activity session list to the user computer device for display.

BRIEF DESCRIPTION OF THE FIGURES

Other advantages of the present disclosure will be readily appreciated, as the same becomes better understood by reference to the following detailed description when considered in connection with the accompanying drawings wherein:

Non-limiting and non-exhaustive embodiments of the present invention are described with reference to the following figures, wherein like reference numerals refer to like parts throughout the various views unless otherwise specified.

FIG. 10 is an illustration of an exemplary screenshot from the system of FIG. 1, according to an embodiment of the present invention;

FIG. 11 is an illustration of an exemplary screenshot from the system of FIG. 1, according to an embodiment of the present invention;

FIG. 12 is an illustration of an exemplary screenshot from the system of FIG. 1, according to an embodiment of the present invention; and FIG. 13 is an illustration of an exemplary screenshot from the system of FIG. 1, according to an embodiment of the present invention.

Figure 1:
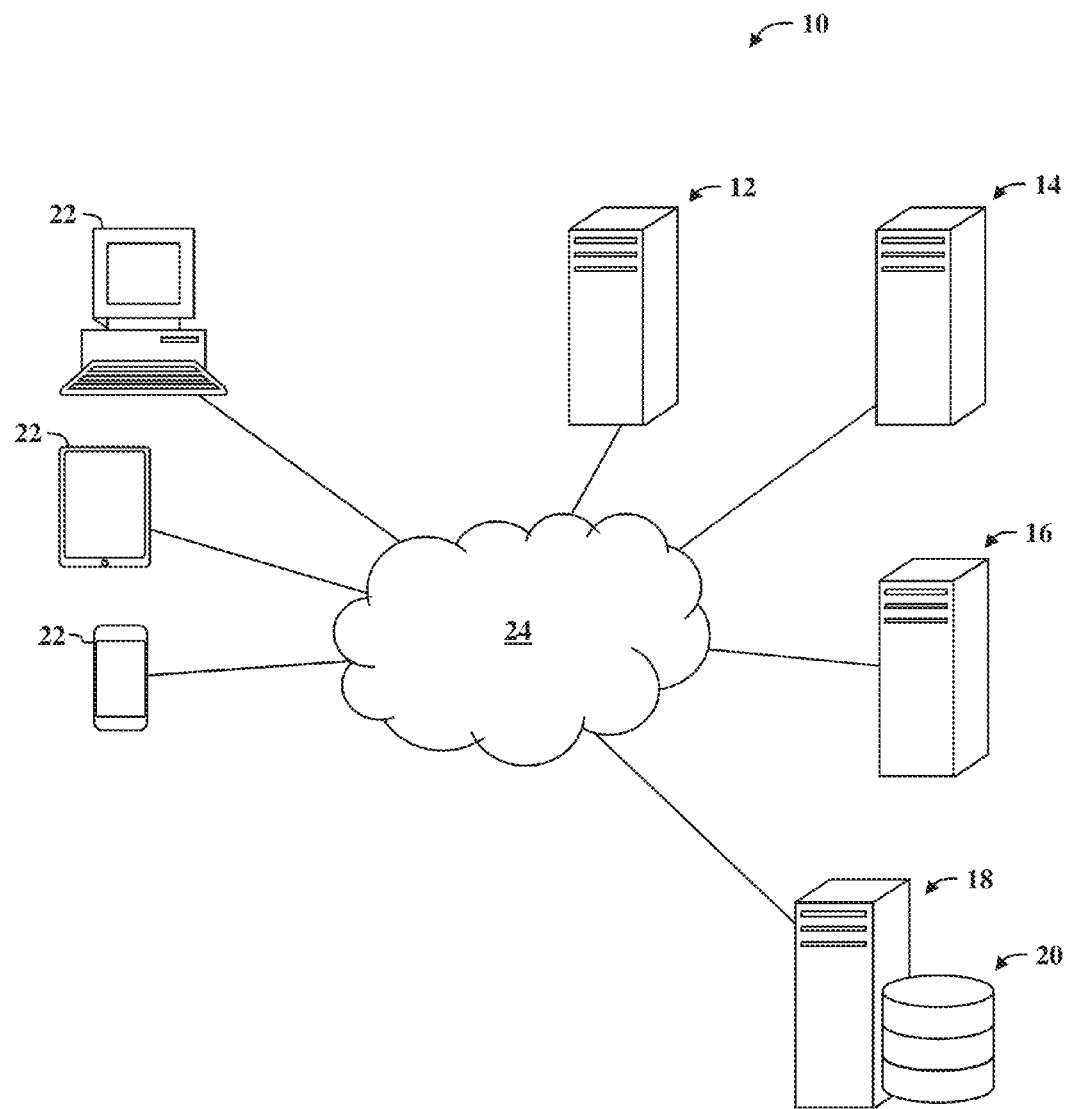
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

The disclosure particularly describes how consumer activity with a website may be monitored to facilitate determining which web pages may induce a consumer to a predefined user activity such as, for example, purchasing a product via the website. Particularly, the present disclosure describes how a system provides a website to a consumer to allow the consumer to purchase and/or order products and/or services via the website, to monitor the website activity of the consumer, and to determine web pages within the website that facilitate inducing the consumer to purchase a product and/or service via the website. For example, in one embodiment, the system may generate tuples, e.g. sets of activity session records that are indicative of activity paths and/or sequences of web pages accessed by a user prior to a purchase being made by the user. In addition, the system may generate conversion rates of web pages that are indicative of a rate at which the consumer views a corresponding web page prior to performing the predefined user activity. In addition, the system may generate resilience rates of web pages that are indicative of a rate at which the consumer views the corresponding web page and does not perform the predefined user activity, e.g. does not purchase a product and/or service via the website.

With reference to the FIGS. and in operation, the present invention provides a system 10, methods and computer product media that facilitates monitoring user activity on a website.

In general, the system 10 is configured to generate and analyze web logs associated with a website to discover user behavior on the website. The system 10 performs a sessionization process based on a session ID. Moreover, the system 10 records logs of consumer activities and the sessionization process splits the logs into sessions using browser based cookie ID associated with the corresponding web browsers to uniquely identify browsing sessions of a consumer on the website. The system 10 enhances the process by uniquely identifying user activity paths. The activity paths are used to generate signals for search ranking. In addition, the system 10 splits user sessions into activity paths and reconstructs missing activity logs.

In one embodiment, the system 10 may include two components: a Session Splitter and a Log Restorer. The Session Splitter splits a session into one or more activity paths. Each consumer/visitor of the website walks through the website in several sessions and in each session the visitor happens to perform several activities. The activities include Search, Browse, etc. If the web log record of each page visited by a user comprises of current page URL and previous page URL, then the current page record is added to the activity path of the previous page. If multiple pages are led by a single page, then multiple activity paths are created with the single page as a starting page. The Log Restorer, runs in two folds: a) to discover when an activity log is missing, and b) to construct the missing activity. In order to achieve the objectives, the log restorer investigates a sequence of activity logs in the given web logs. If the investigation finds that a log record is missing, the log restorer makes up the record to connect previous and subsequent activities without conflicts.

Referring to FIG. 1, an exemplary environment in which the system 10 operates is illustrated. In the illustrated embodiment, the system 10 is configured to enable a user to access a website with one or more user computing devices. The system 10 monitors the web pages being accessed by a user and generates and stores a webpage list that includes a plurality of webpage records. Each webpage record includes information that is associated with a corresponding web page. The system 10 may also generate and store an activity session list that includes a plurality of activity session records that are indicative of a sequence, rate, and/or frequency at which web pages associated with the website are viewed and/or accessed by the user. The system 10 may also generate sets of activity session records the include records that are related to a conversion page such as, for example, an order page at which a user requests to purchase and/or order a product and/or service. The sets of activity session records may be used to determine an activity path and/or sequence of web pages accessed by a user prior to a purchase being made by the user. By generating activity paths that are associated with conversion pages, the system 10 may facilitate identifying web pages that induce a user to purchase one or more products and/or services being offered on the website. In addition, the generated activity paths may be used to identify predefined user website activity such as, for example, navigating away from the website, accessing predefined web pages, terminating a website viewing session, and/or any suitable user activity associated with the website.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a website hosting server 12, an activity log server 14, an activity sessionization server 16, a database server 18, a database 20, and one or more user computing devices 22 that are each coupled in communication via a communications network 24. The communications network 24 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 22 may include any suitable device that enables a user to access and communicate with the system 10 including sending and/or receiving information to and from the system 10 and displaying information received from the system 10 to a user. For example, in one embodiment, the user computing device 22 may include, but is not limited to, a desktop computer, a laptop or notebook computer, a tablet computer, smartphone/tablet computer hybrid, a personal data assistant, a handheld mobile device including a cellular telephone, and the like.

The database server 18 includes a memory device that is connected to the database 20 to retrieve and store information contained in the database 20. The database 20 contains information on a variety of matters, such as, for example, web pages associated with one or more websites, customer account information, user account information, webpage records, webpage lists, activity session records, activity session lists, and/or any suitable information that enables the system 10 to function as described herein.

The website hosting server 12 is configured to host a website 26 that is accessible by a user via one or more user computing devices 22. The website hosting server 12 retrieves and stores web pages 28 (shown in FIGS. 6-9) associated with one or more websites 26 in response to requests received by the user via the user computing device 22 to allow users to interact with the website and purchase goods and/or services via the website. In one embodiment, the website hosting server 12 is configured to generate and display web pages 28 associated with the website in response to requests being received from consumers via corresponding web browsers that are displayed on the user computing devices 22.

In the illustrated embodiment, the activity log server 14 is configured to monitor the web pages being viewed by one or more customers, and to generate and store a webpage list 30 (shown in FIG. 10) in the database 20 including one or more corresponding webpage records 32. Each webpage record 32, e.g. webpage log, may include a plurality of data categories that each include information associated with the corresponding web page being accessed by the user. For example, in one embodiment, a webpage record may include a web browser identifier, a timestamp ID, a webpage ID, a referral ID, page type, page data, outgoing links, and/or incoming links. The web browser ID includes a unique identifier such as, for example, a browser based cookie identifier that is indicative of the web browser accessing the corresponding web page. The timestamp ID includes a time identifier that is associated with a time at which the corresponding web page is being accessed by the user via the web browser. The webpage ID may include a unique webpage identifier such as, for example, a webpage URL that is associated with the corresponding web page. The referral ID may include a unique webpage identifier such as, for example, a webpage URL that is indicative of the previous web page that was viewed and/or accessed prior to the user viewing the corresponding web page. The page type and the page data include data indicative of the type of page and/or information displayed and/or associated with the corresponding web page such as, for example, home page, search page, product page, order page, add to cart page, advertisement page, category page, product data, search data, order data, and/or any suitable information that is indicative of the content displayed with and/or accessible via the corresponding web page. The outgoing links includes identifiers associated with one or more web pages that may be accessed from the corresponding web page. The incoming links includes identifies associated with one or more web pages that may navigate a user to the corresponding web page. Each of the webpage ID, the referral ID, outgoing links, and/or incoming links may include URL information and/or any suitable unique identifier that may be used to identify a particular web page.

In the illustrated embodiment, the activity sessionization server 16 is configured to generate and store an activity session list 34 (shown in FIG. 11) in the database 20 including one or more activity session records 36. In one embodiment, each activity session record 36 is associated with a corresponding webpage record 32. Each activity session record 36, e.g. session log, may include a plurality of data categories that each includes information associated the corresponding web page being accessed by the user. For example, in one embodiment, an activity session record 36 may include a web browser ID, a timestamp ID, a webpage ID, a referral ID, page type, page data, outgoing links, and/or incoming links. In the illustrated embodiment, each activity session record 36 includes an activity session ID that is indicative of an activity path being assigned to the activity session record 36. One or more activity session records 36 may be assigned the same activity session ID to facilitate identifying each corresponding activity session record 36 being associated with the same activity path. Each activity path is indicative of a sequence of web pages being viewed by the user prior to the occurrence of a predefined user activity. For example, in one embodiment, an activity path may be indicative of web pages that were viewed by a user prior to purchasing a product, web pages that navigated a user to a product order page, and/or a sequence of web pages accessed by the user prior to viewing a product order page.

In the illustrated embodiment, the activity sessionization server 16 is configured to receive a request to view an activity session list 34 from a user via a user computing device 22, retrieve an activity session list 34 from the database 20, and transmit the activity session list 34 to the user computing device 22 for display to the user. In addition, the activity sessionization server 16 may display a plurality of session ID's to the user, receive a request to display an activity session list 34 including a selected session ID, generate and/or retrieve an activity session list 34 including activity session records 36 associated with the selected session ID, and send the retrieve records for display on the user computing device 22. The activity sessionization server 16 may also enable a user to display activity session records 36 associated with a browser ID, a web page, page types, page date, timestamps, and/or any suitable data category included in the activity session records 36.

The activity sessionization server 16 may also determine a conversion rate of one or more web pages that may be indicative of a rate at which a corresponding web page facilitates a user completing a predefined user activity such as, for example, viewing a predefined web page, ordering a product and/or service, and/or performing a predefined user task. For example, the activity sessionization server 16 may determine a conversion rate of a web page that is indicative of the number of times the corresponding web page navigates users to a conversion page such as, for example, a product order page. In addition, the activity sessionization server 16 may determine the conversion rate of a plurality of web pages and generate and display a ranking of the web pages based on the conversion rates. By determining the conversion rates of the web pages, the activity sessionization server 16 may facilitate determining a success of a corresponding web page in inducing a user to perform an activity on the website.

The activity sessionization server 16 may also determine a resilience rate of one or more web pages that may be indicative of a rate at which a corresponding web page is being viewed by a user and in which the user does not perform a predefined task. For example, the resilience rate of a web page may be indicative of the number of times a web page is being viewed and does not navigate a user to a conversion page. The activity sessionization server 16 may also determine the resilience rate of a plurality of web pages, generate a ranking of the web pages based on the conversion rates, and identify web pages that are not successful in inducing a user to perform an activity on the website. In the illustrated embodiment, the activity sessionization server 16 may generate and display a conversion report 38 (shown in FIG. 12) including information indicative of a conversion rate of one or more web pages, and generate and display a resilience report 40 (shown in FIG. 13) including information indicative of a resilience rate of one or more web pages.

Figure 2:
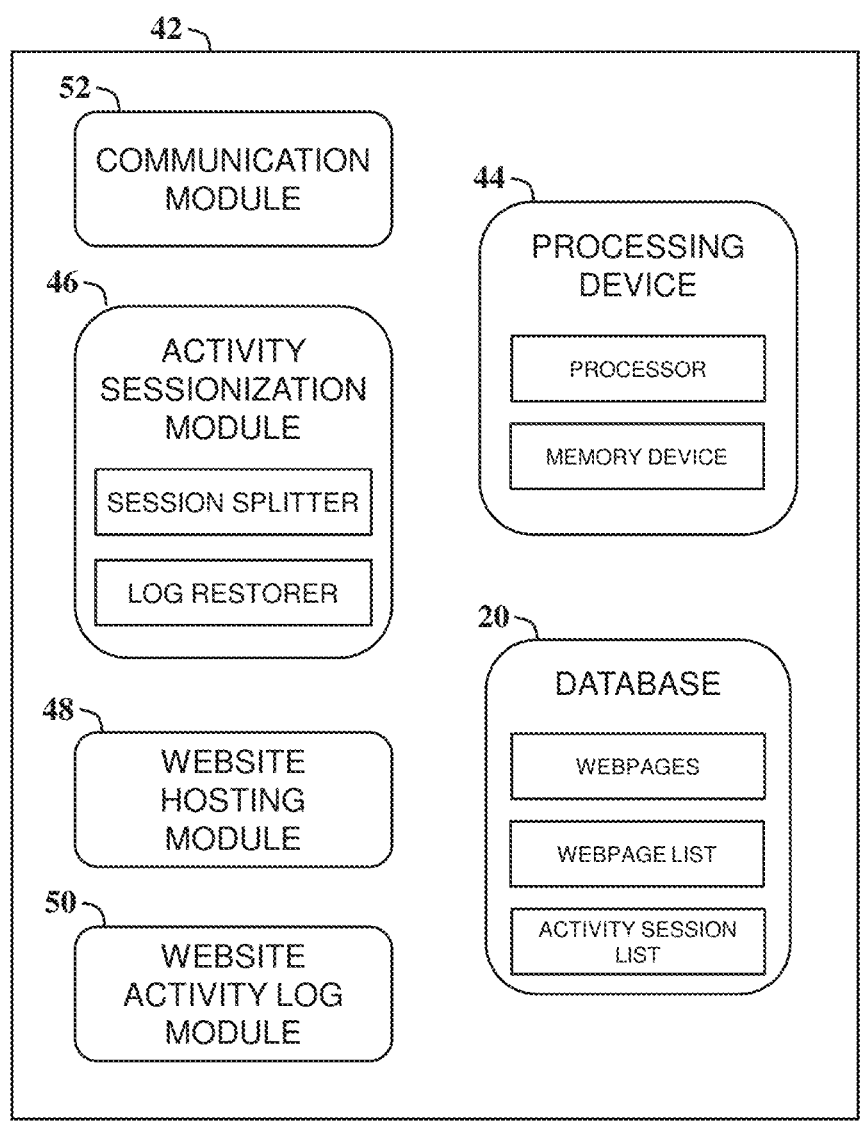
FIG. 2 is a schematic illustrating example components of a server, according to an embodiment of the present invention.

Referring to FIG. 2, in one embodiment, the system 10 may include a system controller 42 that is configured to perform the functions of the website hosting server 12, the activity log server 14, the activity sessionization server 16, and the database server 18. In the illustrated embodiment, the system controller 42 includes a processing device 44 and the database 20.

The processing device 44 executes various programs, and thereby controls components of the system controller 42 according to user instructions received from the user computing device 22. The processing device 44 may include memory, e.g., read only memory (ROM) and random access memory (RAM), storing processor-executable instructions and one or more processors that execute the processor-executable instructions. In embodiments where the processing device 44 includes two or more processors, the processors can operate in a parallel or distributed manner. In an example, the processing device 44 may execute an activity sessionization module 46, a website hosting module 48, and a website activity log module 50, and a communications module 52.

The processing device 44 may also include a memory device for storing programs and information in the database 20, and retrieving information from the database 20 that is used by the processor to perform various functions described herein. The memory device may include, but is not limited to, a hard disc drive, an optical disc drive, and/or a flash memory drive. Further, the memory device may be distributed and located at multiple locations.

The communications module 52 retrieves various data and information from the database 20 and sends information to the user computing device 22 via the communications network 24 to enable the user to access and interact with the system 10. In one embodiment, the communications module 52 displays various images on a graphical interface of the user computing device 22 preferably by using computer graphics and image data stored in the database 20 including, but not limited to, web pages 28, webpage lists 30, webpage records 32, activity session lists 34, activity session records 36, conversion reports 38, resilience reports 40, and/or any suitable information and/or images that enable the system 10 to function as described herein.

The website hosting module 48 may be programmed to perform some or all of the functions of the website hosting server 12 including hosting various web pages associated with one or more websites that are stored in the database 20 and that are accessible to the user via the user computing device 22. The website hosting module 48 may be programmed to generate and display web pages associated with a website in response to requests being received from users via corresponding web browsers.

The website activity log module 50 may be programmed to perform some or all of the functions of the website activity log server 14 including generating and storing webpage lists 30 and/or webpage records 32 associated with the requested web pages in the database 20.

The activity sessionization module 46 may be programmed to perform some or all of the functions of the activity sessionization server 16 including generating activity session lists 34 and/or activity session records 36 for display on a user computing device 22 upon receiving a request from a user. In addition, the activity sessionization module 46 may be programmed to generate and display conversion reports 38, resilience reports 40, and/or any suitable information associated with activity session records 36 and/or information indicative of user activity associated with a website.

In one embodiment, the activity sessionization module 46 may include a session splitter module and a log restorer module. The session splitter module may be programmed to split and/or divide an activity session into one or more activity paths. The webpage record log of each web page visited by a user includes the current page URL and the previous referral page URL. The current webpage record is added to the activity path of a previous page. If multiple pages are led by a single page, then multiple activity paths are created with the single page as starting page. The log restorer module may be programmed to: a) discover when an activity log record is missing from an activity path; and b) construct the missing activity log record. In order to achieve these objectives, the log restorer module investigates the sequence of activity log records in the given web logs. If the investigation finds a log record is missing, the log restorer module makes up the record to connect previous and subsequent activities without conflicts.

Figure 3:
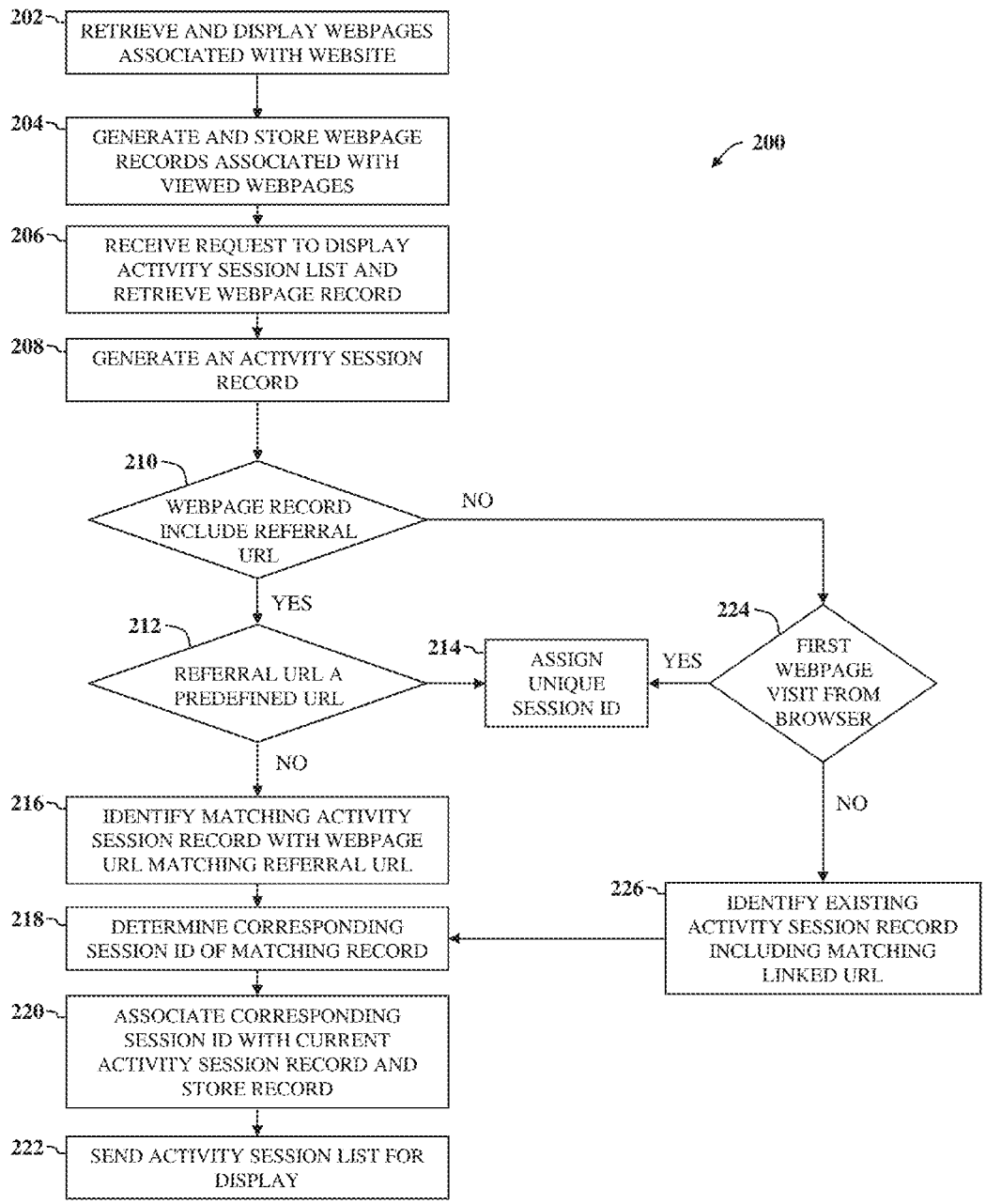
FIG. 3 is a flowchart of a method that may be used with the system shown in FIG. 1, according to an embodiment of the present invention.
Figure 4:
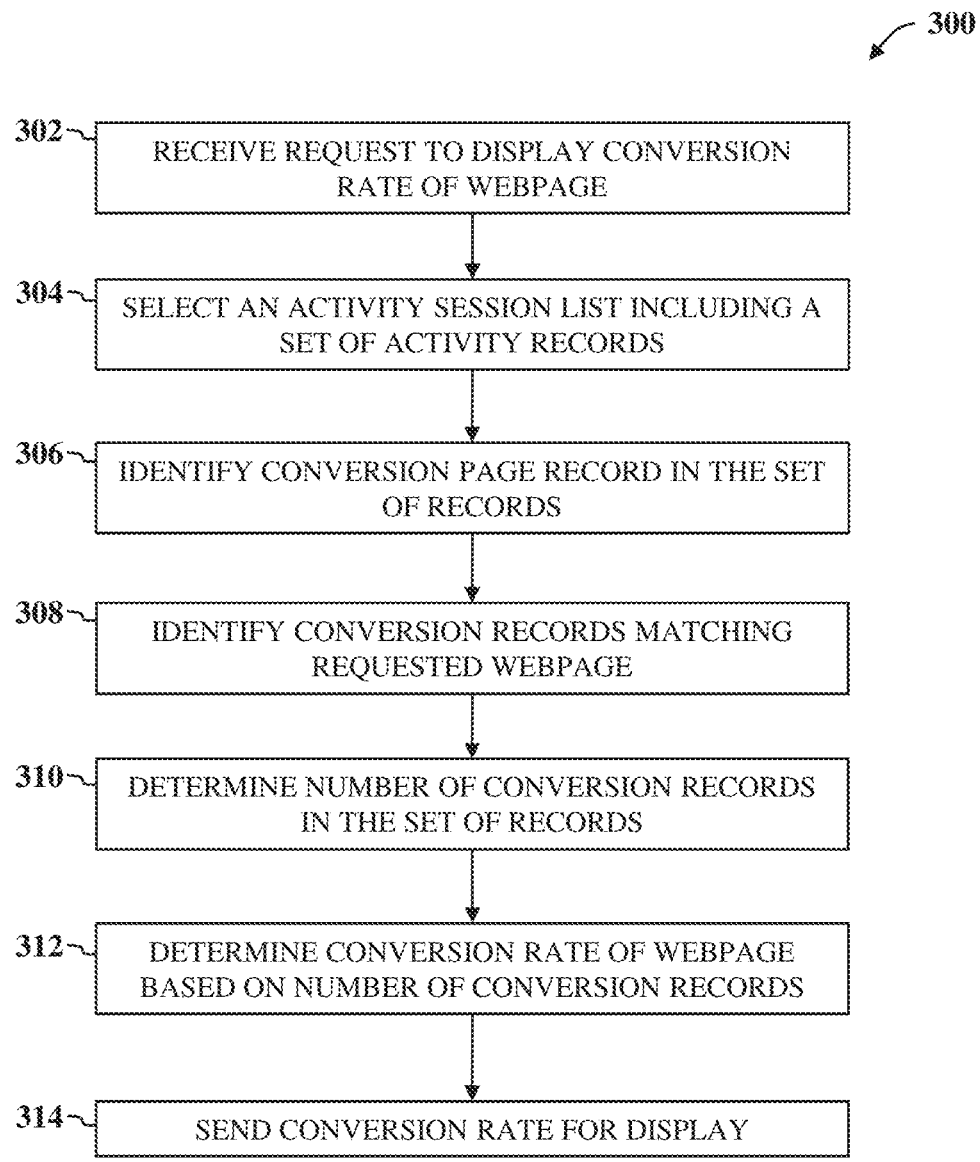
FIG. 4 is a flowchart of a method that may be used with the system shown in FIG. 1, according to an embodiment of the present invention.
Figure 5:
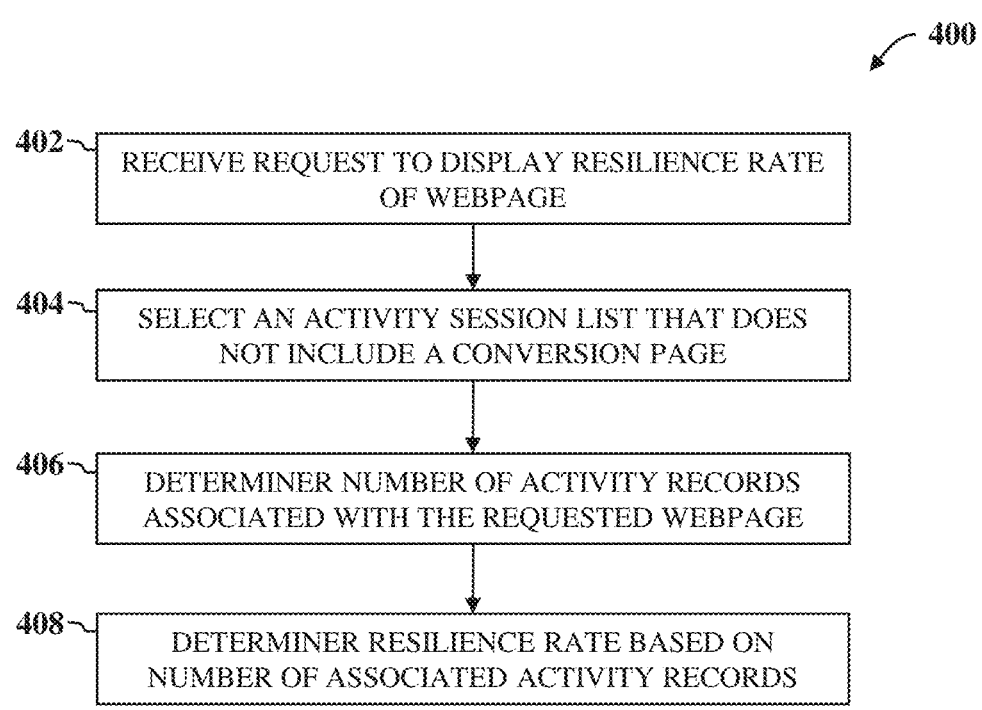
FIG. 5 is a flowchart of a method that may be used with the system shown in FIG. 1, according to an embodiment of the present invention.
Figure 6:
FIG. 6 is an illustration of an exemplary screenshot from the system of FIG. 1, according to an embodiment of the present invention.
Figure 7:
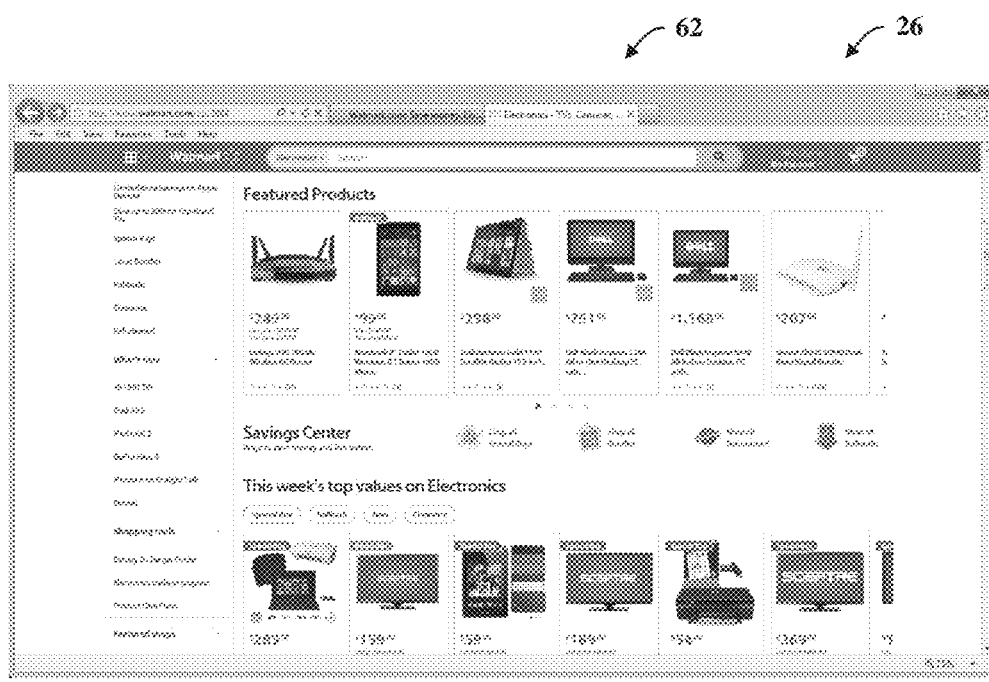
FIG. 7 is an illustration of an exemplary screenshot from the system of FIG. 1, according to an embodiment of the present invention.
Figure 8:
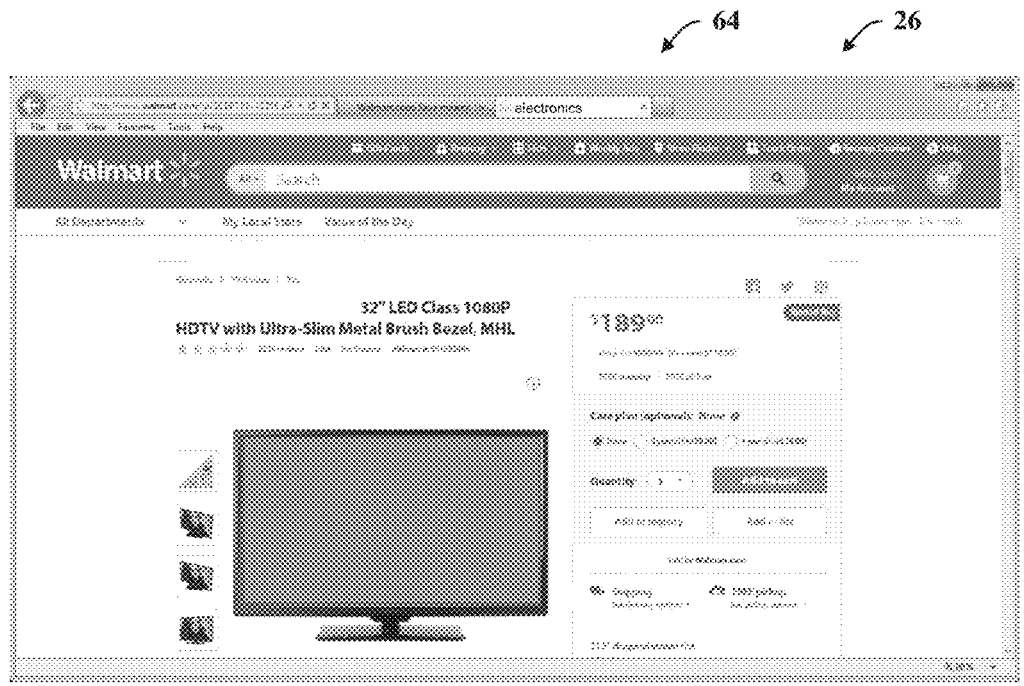
FIG. 8 is an illustration of an exemplary screenshot from the system of FIG. 1, according to an embodiment of the present invention.
Figure 9:
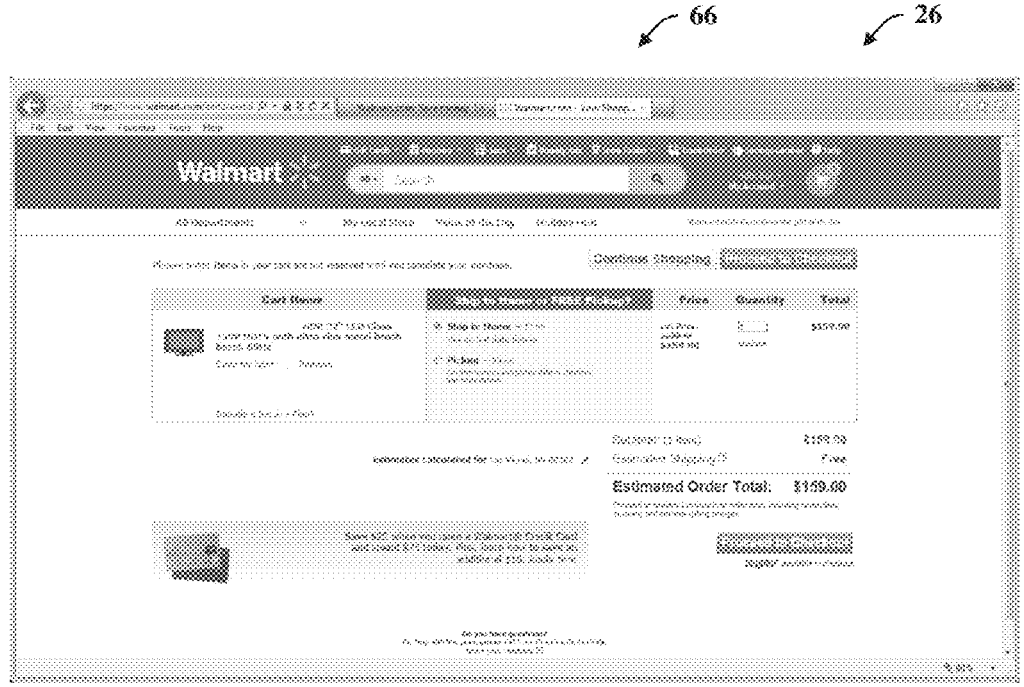
FIG. 9 is an illustration of an exemplary screenshot from the system of FIG. 1, according to an embodiment of the present invention.

FIGS. 3-5 are flowcharts of methods 200, 300, and 400 that may be used with the system 10 for monitoring consumer activity on a website. The methods include a plurality of steps. Each method step may be performed independently of, or in combination with, other method steps. Portions of the methods may be performed by any one of, or any combination of, the components of the system 10. FIGS. 6-13 are exemplary graphical displays that may be displayed by the system 10.

In the illustrated embodiment, in method step 202, the website hosting server 12 receives a request from one or more user computing devices 22 to display one or more web pages 28 associated with a website hosted by the system 10, and retrieves and displays the requested web pages 28 on a corresponding user computing device 22. In one embodiment, the website may include an e-commerce website that enables a consumer to view and purchase and/or order various goods and services from one or more merchants via the website. In other embodiments, the website may be a search engine website, an informational website, a blog, a company website, a forum website, a file-sharing website, a social-networking website, and/or any suitable type of website that may be accessed by a user. In the illustrated embodiment, the website hosting server 12 allows users to simultaneously access multiple web pages via a multi-tabbed web browser (shown in FIGS. 6-9). For example, in one embodiment, the website hosting server 12 may display one or more web pages 28 including, but not limited to, a home page 60, a product category page 62, a product page 64, and/or an order page 66.

In method step 204, the activity log server 14 monitors the activity of each user including generating and storing a webpage record 32 associated with each web page 28 being accessed and/or viewed by the users. In one embodiment, the activity log server 14 may determine a plurality of data values associated with each access web page and generate a corresponding webpage record 32 including the associated data values. For example, in one embodiment, the activity log server 14 may generate and store a webpage record 32 including a web browser ID, a timestamp ID, a webpage ID, a referral ID, page type, page data, outgoing links, and/or incoming links. In addition, the activity log server 14 may generate one or more webpage lists 30 including one or more webpage records 32. Each webpage list 30 may include a plurality of webpage records 32 associated with web pages being accessed by a particular web browser. For example, in one embodiment, the activity log server 14 may assign and/or identify a unique browser ID associated with a web browser program being used to access the website. The activity log server 14 may also associate the browser ID with each web page being viewed with the corresponding web browser. In addition, the activity log server 14 may also generate a webpage list 30 including a plurality of webpage records 32 associated with the same browser ID. In another embodiment, the browser ID may be associated with the user computing device 22 being used to display the corresponding web pages.

In method step 206, the activity sessionization server 16 receives a request to display an activity session list 34 from a user computing device 22 and responsively retrieves a webpage list 30 including a plurality of webpage records 32 for use in generating the activity session list 34. In the illustrated embodiment, the activity sessionization server 16 retrieves a webpage record 32 from a webpage list 30 contained in the database 20. In one embodiment, the activity sessionization server 16 receives the request including a browser ID and retrieves a webpage list 30 associated with the requested browser ID. In another embodiment, the activity sessionization server 16 retrieves a webpage list 30 that includes webpage records 32 associated with a plurality of browser IDs. In the illustrated embodiment, the retrieved webpage record 32 includes at least one of a webpage URL indicative of the associated web page and a referral URL indicative of a previously viewed web page.

In method step 208, the activity sessionization server 16 generates a current activity session record 68 including the webpage URL associated with the retrieved webpage record 32.

In method step 210, the activity sessionization server 16 determines if the retrieved webpage record 32 includes a referral URL. If the retrieve webpage record 32 includes a referral URL, the activity sessionization server 16 proceeds to method step 212 and determines if the referral URL associated with the retrieved webpage record 32 is a predefined URL such as, for example, a search page, a home page, an order page, and/or a conversion page, and/or any suitable web page that may be indicative of a predefined user activity. If the activity sessionization server 16 determines that the referral URL is a predefined URL, the activity sessionization server 16 proceeds to method step 214 and responsively generates a current activity session record 70 associated with the retrieved webpage record 32 including a unique session ID assigned to the current activity session record 68, and stores the current activity session record 68 in the database 20 for use in generating an activity path including the corresponding web page 28.

If the activity sessionization server 16 determines that the referral URL is not a predefined URL, the activity sessionization server 16 proceeds to method step 216 and responsively identifies a matching activity session record 72 included in the activity session list 34 that includes a corresponding webpage URL that matches the referral URL of the retrieved webpage record 32.

In method step 218, the activity sessionization server 16 determines a corresponding session ID associated with the matching activity session record 72. In method step 220, the activity sessionization server 16 associates the corresponding session ID with the current activity session record 68 and stores the current activity session record 68 in the activity session list 34. In one embodiment, the activity sessionization server 16 may sort each webpage record included in the webpage list in a sequential order as a function of each associated timestamp ID, and generate a corresponding activity session record for each of the webpage records in the sequential order.

In method step 222, the activity sessionization server 16 updates and sends the activity session list 34 to the user computing device 22 for display to the user. In one embodiment, the activity sessionization server 16 may receive a request from a user computing device 22 to display the activity session list 34 including a requested session ID. The activity sessionization server 16 responsively retrieves the activity session records 36 that include a corresponding session IDs matching the requested session ID from the activity session list 34, and sends the retrieved activity session records 36 to the user computing device 22 for display to the user.

In one embodiment, in method step 222, the activity sessionization server 16 executes the session splitter module to split and/or divide a session into one or more activity paths. For example, the session splitter module may perform the following method steps including 1) sort webpage record logs by timestamps within a session; 2) initiate an activity session list(A) to hold activity logs; and 3) for each webpage record log(i) in the sorted logs: a.) if the webpage record is the first within a browser session: initiate an activity path with the corresponding activity session log(i) as a starting node with a unique session ID, and add the path to the activity session list (A). If the referral URL does not exists in the webpage record log(i): 1) find the previously visited activity session log(i) that can lead to the corresponding web page; if found, connect the activity session log(i) to the found log node; and if not found, initiate a new activity path with the activity session log(i) as a starting node and add the path to activity session list(A). If the referral URL exists in the webpage log(i): find the corresponding activity session log node for the referral URL; if found, connect the corresponding activity session log(i) to the found log node; and if not found, restore the log node using the log restorer module from the referral URL and connect the activity session log(i) to the restored log node. The activity session list includes a list of the activities in the session. The hierarchy of activity may include the following: Visitor-→Set(sessions)→Set (activities).

Referring again to method step 210, if the activity sessionization server 16 determines that the retrieved webpage record 32 does not include a referral URL, the activity sessionization server 16 proceeds to method step 224 and determines if the retrieved webpage record 32 is indicative of the first web page being accessed by a user within a unique browser session and/or within a predefined period of time. If the retrieved webpage record 32 is indicative of the first accessed web page, the activity sessionization server 16 proceeds to method step 214, and generates the current activity session record 68 associated with the retrieved webpage record 32 including a unique session ID. If the retrieved webpage record 32 is not indicative of the first accessed web page in a browser session, the activity sessionization server 16 proceeds to method step 226 and identifies a matching activity session record 72 that includes a corresponding webpage URL matching one or more linked URLs, determines a corresponding session ID associated with the matching activity session record 72, and associates the corresponding session ID with the current activity session record 68.

In one embodiment, in method step 226, the activity sessionization server 16 executes the log restorer module to evaluate the sequence of activity log records to determine if a log record is missing and to generate a record to connect previous and subsequent activities without conflicts. For example, the log restorer module may identify and retrieve the webpage record log(i) for which the referral log ID node is missing, construct an activity session record log(j) inheriting the attributes from the activity session record of the referral URL of the webpage record log(i), find the activity session record log node that possibly can lead to activity session record log(j), and: 1) if found, connect the activity session record log(j) with the found activity session record log node; and 2) if not found, initiate an new activity path the activity session record log(j) as starting node including a unique session ID and add the path to the activity session list(A).

Referring to FIG. 4, in method step 302, the activity sessionization server 16 may receive a request to display a conversion rate of a web page from a user computing device. In method step 304, the activity sessionization server 16 may select an activity session list 34 including a set of activity records 36. For example, the activity sessionization server 16 may determine a set of activity session records including records having the same session ID.

In method step 306, the activity sessionization server 16 identifies a conversion page activity session record 74 included in the set of activity session records 36 and that is associated with a conversion page.

In method step 308, the activity sessionization server 16 determines each activity session record within the selected set that includes a timestamp ID that is earlier than the conversion page timestamp ID, and identifies the corresponding activity session records as webpage conversion records.

In method step 310, the activity sessionization server 16 identifies the webpage conversion records associated with the requested webpage, and determines a number of identified webpage conversion records associated with the requested web page and included in the set of activity session records.

In method steps 312 and 314, the activity sessionization server 16 determines the conversion rate of the requested webpage as a function of the number of webpage conversion records and sends the conversion rate to the user computing device 22 for display to the user.

In one embodiment, the activity sessionization server 16 may determine a conversion rate for a plurality of web pages and generate a conversion list 38 including a ranking of each web page based on the corresponding conversion rates. In another embodiment, the activity sessionization server 16 may transmit the conversion rates associated with each web page to the website hosting server 12 for use in determining which web pages may be displayed in response to a search request being performed by a user to facilitate displaying those web pages that are more likely to induce the user to complete a predefined activity such as, for example, visiting an order page to order a product.

In one embodiment, the activity sessionization server 16 may find conversions of a web page by grouping activity session records by ActivitySessionID, selecting tuples with the requested page and conversion page, and if the given page's timestamp is less than the timestamp of conversion page, count the web page as a conversion of the web page. In addition, the activity sessionization server 16 may also generate a ranking of web pages including grouping the activity session records by ActivitySessionID, selecting tuples for each web page and conversion page, and if given web page's timestamp is less than the timestamp of conversion page, count as conversion of the web page. The activity sessionization server 16 may also order the pages by their conversions, with most conversions page appearing at the top of the order. The results of a search on the website should be ordered by the conversion from the previous step.

Referring to FIG. 5, in method step 402, the activity sessionization server 16 may receive a request to display a resilience rate of a webpage. In method step 402, the activity sessionization server 16 selects an activity session list that does not include a conversion page. For example, the activity sessionization server 16 may determine a set of activity records that includes records having the same session ID and determine if the set of activity records does not include a conversion page. In method steps 406 and 408, the activity sessionization server 16 determines a number of webpage activity session records included in the set of activity records and associated with the requested web page, determines the resilience rate of the requested web page as a function of the number of associated webpage activity session records, and generates and displays a resilience list 40 including a ranking of each webpage based on the corresponding resilience rates.

For example, in one embodiment, the activity sessionization server 16 may group the activity session records by ActivitySessionID, select tuples for each page and no conversion page, count the number of tuples for each page_type, and generate an order of the pages by their count, with the most count values being placed on top. The top ranked pages in the list are the pages that are hurting the website most in conversions. The activity sessionization server 16 may transmit the resilience rates associated with each webpage to the website hosting server 12 for use in determining which web pages may be displayed in response to a user request.

In one embodiment, the activity sessionization server 16 may determine a number of subsequent activity session records included in the set of activity records having a timestamp ID that is later than the timestamp ID of the conversion record, determine, for each webpage URL, a number of subsequent activity session records including the corresponding webpage URL, and generate a non-conversion list including a ranking of each webpage URL based on the corresponding number of subsequent activity session records including the corresponding webpage URL.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system for monitoring consumer activity on a website, comprising:
    a memory device configured to store a webpage list and an activity session list, the webpage list including a plurality of webpage records associated with the website, the website including a plurality of webpages, each of the plurality of webpage records including at least one of a webpage uniform resource locator (URL) indicative of an associated webpage of the plurality of webpages or a referral URL indicative of a previously viewed webpage of the plurality of webpages, wherein the associated webpage has been viewed by a user after the previously viewed webpage, the activity session list indicating a sequence of webpages of the plurality of webpages accessed by users and including a plurality of activity session records, and each of the activity session records including a webpage URL and a session ID; and
    an activity sessionization server including a processor programmed to perform:
        receiving a request from a user computing device to display the activity session list;
        retrieving a webpage record of the plurality of webpage records from the webpage list in response to the received request;
        generating a current activity session record including a webpage URL associated with the webpage record retrieved;
        determining if the webpage record retrieved includes the referral URL;
        identifying a matching activity session record that includes a corresponding webpage URL that matches the referral URL of the webpage record retrieved;
        determining a corresponding session ID associated with the matching activity session record;
        associating the corresponding session ID with the current activity session record;
        storing the current activity session record in the activity session list;
        sending the activity session list to the user computing device for display;
        receiving a request to display a conversion rate of a requested webpage;
        accessing the activity session list;
        selecting an activity session record of the plurality of activity session records associated with the requested webpage;
        determining a set of activity session records of the plurality of activity session records in which the session ID of each of the activity session records in the set of activity session records is the same as the session ID included in the activity session record associated with the requested webpage;
        determining the conversion rate of the requested webpage as a function of a quantity of the activity session records included in the set of activity session records, comprising:
            identifying a conversion page activity session record included in the set of activity session records, the conversion page activity session record being associated with a conversion pane and including a conversion page timestamp ID;
            identifying webpage conversion records associated with the requested webpage, each webpage conversion record having a corresponding timestamp ID that is earlier than the conversion page timestamp ID;
determining a quantity of the webpage conversion records included in the set of activity session records; and
determining the conversion rate of the requested webpage as a function of the quantity of the webpage conversion records; and
displaying the conversion rate of the requested webpage.

2. The system of claim 1, wherein:
the request from the user computing device to display the activity session list comprises a requested session ID; and
the processor is further programmed to perform:
retrieving activity session records of the plurality of activity session records that include corresponding session IDs matching the requested session ID; and
sending the activity session records retrieved to the user computing device for display.

3. The system of claim 1, wherein:
each of the plurality of webpage records includes a linked URL indicative of another webpage associated with the webpage URL corresponding to the each of the plurality of webpage records; and
the processor if further programmed to perform:
determining if the webpage record retrieved does not include the referral URL;
identifying a matching activity session record of the plurality of activity session records in which the webpage URL of the matching activity session record matches the linked URL; and
associating the session ID corresponding to the matching activity session record with the current activity session record.

4. The system of claim 1, wherein the processor is further programmed to perform:
determining if the webpage record retrieved does not include the referral URL; and
generating the current activity session record including a unique session ID.

5. The system of claim 1, wherein the processor is further programmed to perform:
determining if the referral URL associated with the retrieved webpage record retrieved is a predefined URL; and
generating the current activity session record including a unique session ID.

6. The system of claim 5, wherein the predefined URL is indicative of at least one of a category page, an order page, or a home page.

7. The system of claim 1, further comprising:
a website hosting server configured to generate and display the plurality of webpages of the website in response to requests being received from consumers via corresponding web browsers; and an activity log server configured to generate and store the plurality of webpage records associated with requested the plurality of webpages, each of the plurality of webpage records including a corresponding web browser ID and a timestamp ID.

8. The system of claim 7, wherein the processor is further programmed to perform:
sorting each of the plurality of webpage records included in the webpage list in a sequential order as a function of the timestamp ID of each of the plurality of webpage records,
wherein
the activity session record for each of the plurality of webpage records is generated in the sequential order.

9. The system of claim 1, wherein the processor is further programmed to perform:
determining a conversion rate for each of the plurality of webpages; and
generating a conversion list including a ranking of each webpage of the plurality of webpages based on the conversion rates for each of the plurality of webpages.

10. The system of claim 1, wherein the processor is further programmed to perform:
receiving a request to display a resilience rate of a second webpage;
determining a second set of activity records of the plurality of activity session records in which the session ID is identical;
determining if the second set of activity records does not include a conversion page;
determining a quantity of webpage activity session records included in the second set of activity records and associated with the second webpage; and
determining the resilience rate of the second webpage as a function of the quantity of the webpage activity session records.

11. A method for monitoring consumer activity on a website, the method comprising:
generating and storing a webpage list in a memory device, the webpage list including a plurality of webpage records associated with the website, the website including a plurality of webpages, each of the plurality of webpage records including at least one of a webpage uniform resource locator (URL) indicative of an associated webpage of the plurality of webpages or a referral URL indicative of a previously viewed webpage of the plurality of webpages, and the associated webpage having been viewed by a user after the previously viewed webpage;
generating and storing an activity session list in the memory device, the activity session list indicating a sequence of webpages of the plurality of webpages accessed by users, the activity session list including a plurality of activity session records, and each of the activity session records including a webpage URL and a session ID;
receiving a request from a user computing device to display the activity session list;
retrieving, by an activity sessionization server, a webpage record of the plurality of webpage records from the webpage list;
generate a current activity session record including a webpage URL associated with the webpage record retrieved;
determining if the webpage record retrieved includes the referral URL;
identifying a matching activity session record that includes a corresponding webpage URL that matches the referral URL of the webpage record retrieved;
determining a corresponding session ID associated with the matching activity session record;
associating the corresponding session ID with the current activity session record;

storing the current activity session record in the activity session list;
sending the activity session list to the user computing device for display;
receiving a request to display a conversion rate of a requested webpage;
accessing the activity session list;
selecting an activity session record of the plurality of activity session records associated with the requested webpage;
determining a set of activity session records of the plurality of activity session records in which the session ID of each of the activity session records in the set of activity session records is the same as the session ID included in the activity session record associated with the requested webpage; determining the conversion rate of the requested webpage as a function of a quantity of the activity session records included in the set of activity session records, comprising:
  identifying a conversion page activity session record included in the set of activity session records, the conversion page activity session record being associated with a conversion page and including a conversion page timestamp ID;
  identifying webpage conversion records associated with the requested webpage, each webpage conversion record having a corresponding timestamp ID that is earlier than the conversion page timestamp ID;
  determining a quantity of the webpage conversion records included in the set of activity session records; and
  determining the conversion rate of the requested webpage as a function of the quantity of the webpage conversion records; and
displaying the conversion rate of the requested webpage.

12. The method of claim 11, wherein:
the request from the user computing device to display the activity session list comprises a requested session ID; and
the method further comprises:
retrieving activity session records of the plurality of activity session records that include corresponding session IDs matching the requested session; and
sending the activity session records retrieved to the user computing device for display.

13. The method of claim 11, wherein:
each of the plurality of webpage records includes a linked URL indicative of another webpage associated with the webpage URL corresponding to the each of the plurality of webpage records; and
the method further comprising:
  determining if the webpage record retrieved does not include the referral URL;
  determining a matching activity session record of the plurality of activity session records in which the webpage URL of the matching activity session record matches the linked URL; and
  associating the session ID corresponding to the matching activity session record with the current activity session record.

14. The method of claim 11, further comprising:
determining if the referral URL associated with the webpage record retrieved is a predefined URL; and
generating the current activity session record including a unique session ID.

15. The method of claim 14, wherein the predefined URL is indicative of at least one of a category page, an order page, or a home page.

16. The method of claim 11, further comprising:
generating and displaying the plurality of webpages of the website in response to requests being received from consumers via corresponding web browsers;
generating and storing the plurality of webpage records associated with the plurality of webpages, each of the plurality of webpage records including a corresponding web browser ID and a timestamp ID; and
sorting each of the plurality of webpage records included in the webpage list in a sequential order as a function of the timestamp ID of each of the plurality of webpage records;
wherein:
  the activity session record for each of the webpage records is generated in the sequential order.

17. The method of claim 11, further comprising:
receiving a request to display a resilience rate of a second webpage;
determining a second set of activity records of the plurality of activity session records in which the session ID is identical;
determining if the second set of activity records does not include a conversion page;
determining a quantity of webpage activity session records included in the second set of activity records and associated with the second webpage; and
determining the resilience rate of the second webpage as a function of the quantity of the webpage activity session records.

18. One or more non-transitory computer-readable storage media, having computer-executable instructions embodied thereon, wherein when executed by at least one processor, the computer-executable instructions cause the processor to perform:
generating and storing a webpage list in a memory device, the webpage list including a plurality of webpage records associated with a website, the website including a plurality of webpages, each of the plurality of webpage records including at least one of a webpage uniform resource locator (URL) indicative of an associated webpage of the plurality of webpages or a referral URL indicative of a previously viewed webpage of the plurality of webpages, and the associated webpage having been viewed by a user after the previously viewed webpage;
generating and storing an activity session list in the memory device, the activity session list indicating a sequence of webpages of the plurality of webpages accessed by users, the activity session list including a plurality of activity session records, and each of the activity session records including a webpage URL and a session ID;
receiving a request from a user computing device to display the activity session list;
retrieving a webpage record of the plurality of webpage records from the webpage list in response to the request received;
generating a current activity session record including a webpage URL associated with the webpage record retrieved;
determining if the webpage record retrieved includes the referral URL;

identifying a matching activity session record that includes a corresponding webpage URL that matches the referral URL of the webpage record retrieved;

determining a corresponding session ID associated with the matching activity session record;

associating the corresponding session ID with the current activity session record;

storing the current activity session record in the activity session list;

sending the activity session list to the user computing device for display;

receiving a request to display a conversion rate of a requested webpage;

accessing the activity session list;

selecting an activity session record of the plurality of activity session records associated with the requested webpage;

determining a set of activity session records of the plurality of activity session records in which the session ID of each of the activity session records in the set of activity session records is the same as the session ID included in the activity session record associated with the requested webpage;

determining the conversion rate of the requested webpage as a function of a quantity of the activity session records included in the set of activity session records, comprising:

identifying a conversion pale activity session record included in the set of activity session records, the conversion page activity session record being associated with a conversion page and including a conversion page timestamp ID;

identifying webpage conversion records associated with the requested webpage, each webpage conversion record having a corresponding timestamp ID that is earlier than the conversion pale timestamp ID;

determining a quantity of the webpage conversion records included in the set of activity session records; and determining the conversion rate of the requested webpage as a function of the quantity of the webpage conversion records; and displaying the conversion rate of the requested webpage.

\* \* \* \* \*